MINIATURIZED POTENTIOMETER WITH RESISTOR ELEMENT, WIPER AND SUPPORT THEREFOR CONCENTRICALLY MOUNTED AND ELECTRICALLY CONNECTED

Filed July 5, 1966 2 Sheets-Sheet 1

INVENTOR.
EDWARD H. TUMBUSCH,
BY HIS ATTORNEYS
Spensley & Horn.

INVENTOR.
EDWARD H. TUMBUSCH,
By HIS ATTORNEYS
Spensley & Horn.

3,399,367

MINIATURIZED POTENTIOMETER WITH RESISTOR ELEMENT, WIPER AND SUPPORT THEREFOR CONCENTRICALLY MOUNTED AND ELECTRICALLY CONNECTED

Edward H. Tumbusch, Sepulveda, Calif., assignor to Techno-Components, Inc., Van Nuys, Calif., a corporation of California Filed July 5, 1966, Ser. No. 562,812
10 Claims. (Cl. 338—175)

ABSTRACT OF THE DISCLOSURE

This invention relates to a potentiometer and more particularly to a miniaturized potentiometer. The potentiometer disclosed is of a type having resistance wound about a donut shaped member of a selected cross-section with the wiper member mounted on an axis substantially concentric therewith. The parts in the potentiometer are arranged to provide a particularly compact and miniaturized potentiometer with high reliability, rugged construction for resisting vibration, moisture proof and readily adjustable positioning of the output leads.

A potentiometer is basically a variable voltage divider device or, stated differently, it is a resistor which has a variable contact arm so that any portion of the potential applied between its ends may be selected. An almost infinite variety of applications exist for potentiometer devices in the electronics field such as, for example, radio, instrumentation, controls, etc. In radio, for example, potentiometer devices are oftentimes used to intercouple succeeding stages and also used in circuitry for volume control. Again by way of example, in the instrumentation art a potentiometer will oftentimes be used as one of the arms in a bridge circuit of a meter.

Space and missile programs of today require efficient packaging of electronics. It is required in most systems that the electronic packaging be as small as achievable in the state of the art consistent with the high degree of reliability required in stringent environments encountered by missiles. The advent of solid state components and printed circuitry has advanced the electronic packaging art to the point where complex electronic circuitry in general can be packaged in incredibly small spaces. One of the major problems to date has been to achieve potentiometer constructions which are sufficiently small to meet the growing need for miniaturization and yet retain the high degree of reliability required in missile and space programs. The potentiometers must be able to withstand the particularly high levels of vibration and shock encountered in missile flight. Ultra-miniaturized potentiometers are also desirable for use in modern radio equipment where an entire radio may be installed in a pair of spectacles. Many of the problems of miniaturization have been solved by a potentiometer which is the subject of my Patent No. 3,096,498, patented July 2, 1963, in the United States Patent Office. The present invention is a substantially improved version of that potentiometer and is capable of substantially more miniaturized construction than potentiometers heretofore available.

Potentiometers are adjustable and thus must have access to the adjustment means. Providing such access is one of the problems encountered in miniaturization. Typically, a potentiometer has a wiper arm which is in some way actuated by means of a small screw head external to the main potentiometer housing of the case. The relative location of this adjustment screw and the leads or pins of the potentiometer make it difficult and often impossible to achieve the most compact packaging together with access to the adjustment screw. As the potentiometer becomes more and more miniature it becomes increasingly difficult to provide a potentiometer with sufficient structural strength to be used in the severe environments mentioned hereinabove. When the smallest sizes are desired it is no longer a simple matter of scaling down existing designs, rather it becomes necessary to create an entirely new design which brooks no compromise in reliability.

Accordingly, it is an object of the present invention to provide an ultra-miniature potentiometer.

It is another object of the present invention to provide a potentiometer that is extremely reliable both mechanically and electrically.

It is a further object of the invention to provide a potentiometer which is accurately adjustable.

Yet another object of this invention is to provide a potentiometer which provides ready accessibility of its adjustment screw coupled with the most compact possible orientation in a circuit package.

Another object of this invention is to provide a potentiometer in which the adjustment screw is precisely retained for accurate potentiometer adjustment.

A further object of this invention is to provide a potentiometer in which the wiper actuation mechanism is precise and durable.

It is another object of this invention to provide a potentiometer which is economical to manufacture.

The invention herein comprises a potentiometer which has a two section housing containing a wound resistance. One section is constructed with multiple recesses for holding the wiper lead so that the potentiometer may be oriented in a circuit package in the most compact manner with the adjustment screw being readily accessible. The adjustment screw or worm drives a pinion gear to which is connected a wiper arm. The arm is supported and rotates about a shaft-like pin member which also provides the electrical lead to the wiper. The wiper arm contacts the resistance element at a point between its ends which point is determined by the setting of the adjustment screw. The pinion gear, although very small, is fitted centrally with a bushing for great endurance and precision of operation. The pinion gear is also geared through only a portion of its shank to provide a strong gear that can withstand severe environmental stresses. The adjustment screw is retained in the potentiometer case by a keeper blade which is extremely compact and which provides retention without attendant backlash when the adjustment screw is being set.

An alternative form of the invention has bottom pins which are constructed to form moisture traps and has a novel pin arrangement to provide standard pin spacing in an ultraminiature potentiometer.

The novel features in which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 1:
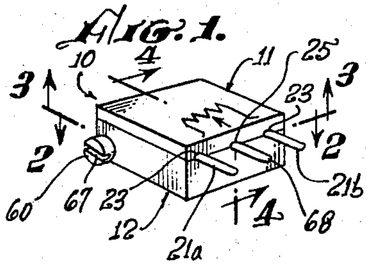
FIGURE 1 is a perspective view of a potentiometer according to the invention with the adjustment screw oriented in a particular position with respect to the electrical leads.
Figure 5:
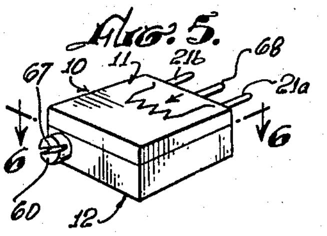
FIGURE 5 is a perspective view of the potentiometer shown in FIGURE 1 with adjustment screw oriented in another position from that of FIGURE 1 relative to the leads; and, FIGURE 6 is a top plan view with the cover partly broken away of the invention as shown in FIGURE 5.

Referring now to the drawing, the potentiometer shown in FIGURES 1 through 6 comprises generally a housing 10 which is made in two parts, a cover section 11 and a base section 12.

Fixedly mounted to the cover 10 is a wire wound resistance element 13 with the wire wrapped around a generally circular core 14. A suitable shaped recess 15 is provided in the cover 11 to accommodate the circular wire wound resistance element 13. The recess 15 is formed by the cylindrical wall 18. As can best be seen in FIGURE 3, a cut out 19 is made in wall 18 and the resistance element 13 is oriented so that its ends 20 are aligned with the cut out 19 such that electrical leads 21*a* and 21*b* can be readily connected as by spot welding or soldering to the ends 20. The leads 21 are arranged in recessed channel sections 22 and proceed beyond the cover 11 through slots 23 formed therein. Centrally located between slots 23 is a third slot 25 in the cover through which, as will be discussed hereinbelow, the lead connected to the wiper will be drawn. Thus, the cover assembly comprises the molded plastic cover 11, with resistance element 13 affixed therein and leads 21 connected to the resistance element and drawn through channels 23 provided therefor.

Figures 2, 3, 4, 6:
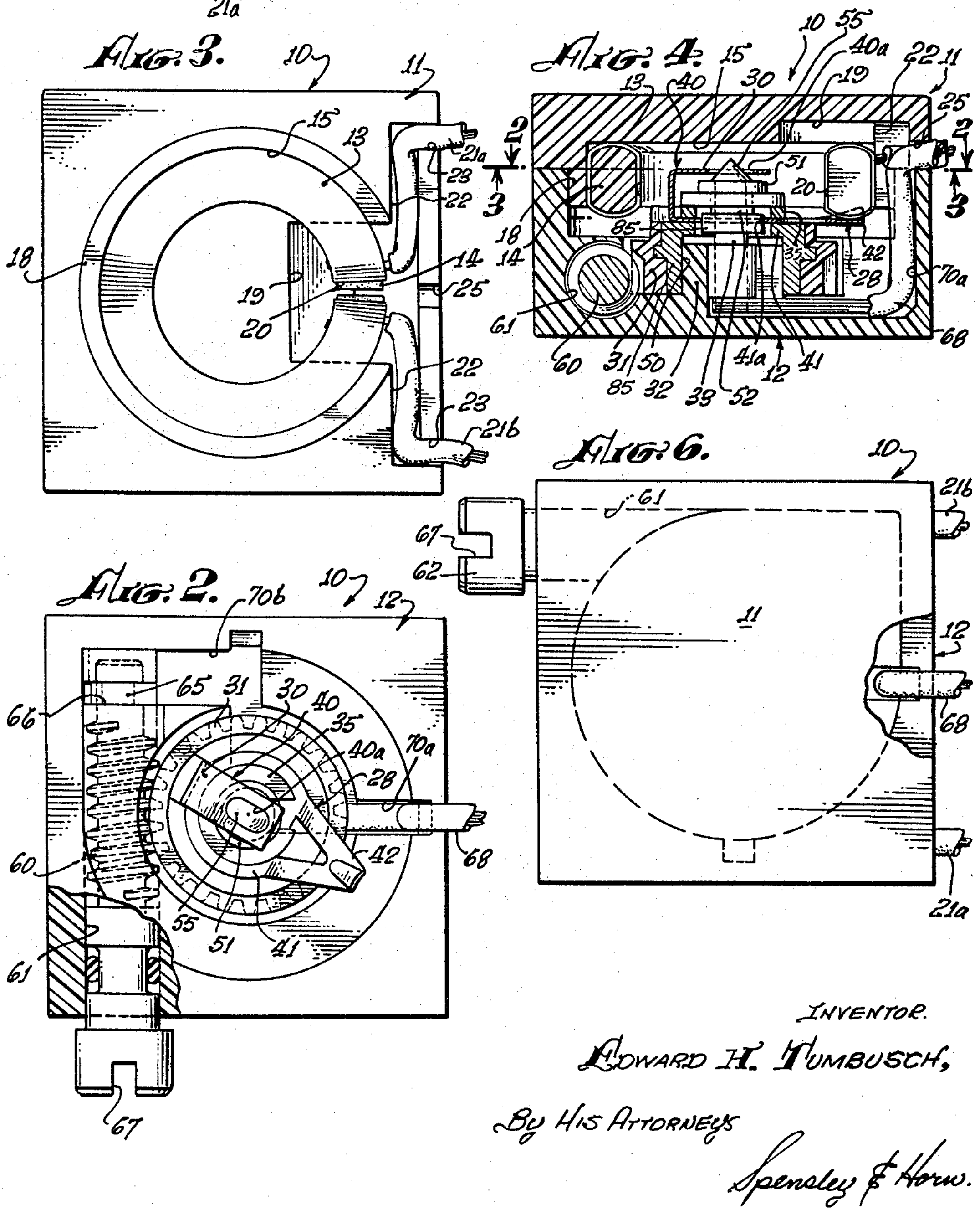
FIGURE 2 is a view taken generally along line 2—2 of FIGURES 1 and 4. This view is a top plan view, partially in section, of the lower case assembly as it appears when removed from the top cover assembly.
FIGURE 3 is a view taken generally along line 3—3 of FIGURES 1 and 4.
FIGURE 4 is a sectional view taken along line 4—4 of FIGURE 1.
Figure 7:
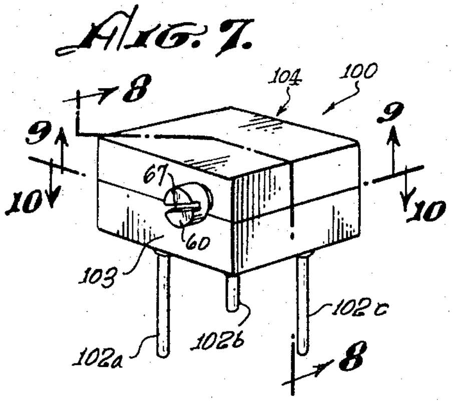
FIGURE 7 is a perspective view of an alternative embodiment of the invention having bottom pins.
Figure 9:
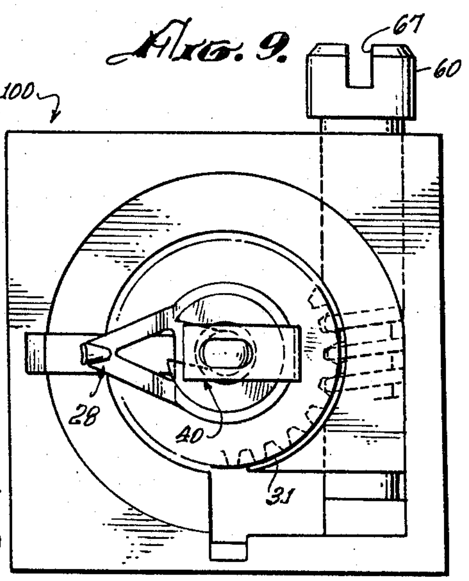
FIGURE 9 is a sectional view taken along line 9—9 of FIGURE 7.

Referring now to FIGURES 2 and 4, the wiper arm and its actuating mechanism as installed in the base housing section 12 can be readily seen. The wiper arm 30 is non-rotatably affixed to pinion gear 31. Pinion gear 31 is rotatably mounted on a hollow cylindrical shaped boss 32 which is centrally located in an upright position on the bottom casing. The pinion gear 31 is made of a plastic such as that known as KEL–F for smooth operation. The gear 31 is provided with a central bushing 85 which is made of brass or other suitable metal. The bushing 85 eliminates any eccentric motion of the gear 31 due to wearing. To provide added strength of the KEL–F gear, the gear 31 does not have the teeth therein fully formed. That is, the part of the gear 31 which is not in contact with the worm is not cut. Thus, the gear 31 is considerably strengthened without sacrificing the efficacy of meshing. A pivot 33 is mounted in a vertical position in the hollow of the boss. Above the pinion gear 31 and resting on both the gear 31 and pivot 33 is the wiper arm 28. The wiper arm is held firmly in contact with gear 31 and the pivot 33 by means of retaining ring 35. The wiper arm 30 comprises, generally, three portions, namely, an L-shaped portion 40, an annular shaped disc-like portion 41 and a V-shaped element 42. Element 40 has a long side and a short side bent at a right angle to the long side to form an L-shape, the long side having an elongated hold 40*a* therein. Portion 41 is integral with and extends from the short side of portion 40 and at right angles to it so that element 41 is substantially parallel to the long side of element 40. Element 41 defines a circular hole 41*a* therethrough located beneath an elongated hole 40*a* so that the two holes have the same center line. The V-shaped element 42 is integral with and extends upright from portion 41 and away from the long side element 40 so that its plane forms an acute angle with the plane of element 41. Finally, the apex of element 42 is concavely shaped downward. The pivot 32 is non-rotatably mounted in the cavity 50. As can be seen particularly in FIGURE 4, an extended diameter section 51 of the pivot 33 bears down upon retaining ring 35 which in turn retains the wiper arm 30 to the enlarged diameter section 52 of the pivot 33. The wiper arm is readily centered onto the pivot 33 by means of hole 41*a*. The upper part of the pivot 33 is provided with a conical section 55 which in part protrudes through hole 40*a* of the wiper arm and thereby retains the wiper arm in place. When the potentiometer is assembled, the V-shaped portion 42 is pushed downward by bearing against resistance element 31 so that a spring action is produced. Thus, the apex portion of the wiper arm is borne firmly against the element 13 and the electrical contact, thus vibration and shock resistance is achieved. The wiper arm position on the resistance 13 is determined by the angular position of pinion gear 31. The position of the pinion gear is adjusted by means of the adjustment screw of worm 60. The threads of the screw 30 mesh with the teeth of pinion gear 31. The screw 60 is inserted in a cylindrical tunnel 61 bored into the base section 12 at one side thereof. The diameter of tunnel 61 is slightly larger than the diameter of screw 60 so that the worm screw 60 can be easily turned. The screw 60 is retained in the proper longitudinal position in the tunnel by means of a keeper blade 65 which extends into a groove 66 circumferentially machined in the body portion of the screw 30. The keeper blade 65 is economical to manufacture and takes a minimum of space since a minimum width slot in the screw 60 can accommodate it and yet it keeps the screw 60 firmly in place longitudinally and allows it to rotate freely thus providing excellent resistance to vibration and shock. The unthreaded end of the screw 60 protrudes from the potentiometer casing and has a slot 67, so that the screw 60 may be easily adjusted or turned with the aid of a screwdriver, coin or the like. An electrical lead 68 is soldered or spot welded to the base of the pivot 32. The lead is drawn out of the case through a special recess 70*a* provided therefor in the base section 12 of the housing. Also provided is special lead recess 70*b* located in the base section 12 of the housing. The recess 70*b* is at right angles to the recess 70*a*. Thus, it is readily observed that the slot 25 of the cover 11 can be aligned in final assembly with either recess 70*a* or recess 70*b*. Thus, it is apparent that the adjustment screw may be located either behind the leads or at right angles to the leads. This provides an extremely significant advantage for ultraminiaturized packaging because often a circuit configuration requires the leads to be particularly oriented for compactness as well as electrical requirements as in high frequency circuitry. In other potentiometers when the lead orientation is determined, the accessibility of the adjustment screw is fixed. Often under these circumstances, the adjustment screw will not be readily accessible and a compromise must be made in packaging or circuit operation. However, with the present invention as discussed hereinabove, lead orientation does not predetermine adjustment screw accessibility since, as was stated before, the adjustment screw may be varied in location by rotating the cover assembly 11 with respect to the base assembly 12.

Referring now to FIGURES 7 through 10, there is shown an alternative embodiment of invention which is a potentiometer 100 having an alternative pin arrangement. In this embodiment, pins 102 are molded in the bottom section 103 of the potentiometer case 104. In all respects except for the pin structure and arrangement, the potentiometer 100 is substantially equivalent to the potentiometer 10 shown in FIGURES 1 through 6. Of course the case 104 of the potentiometer is modified to adapt to the pins 102.

Figure 8:
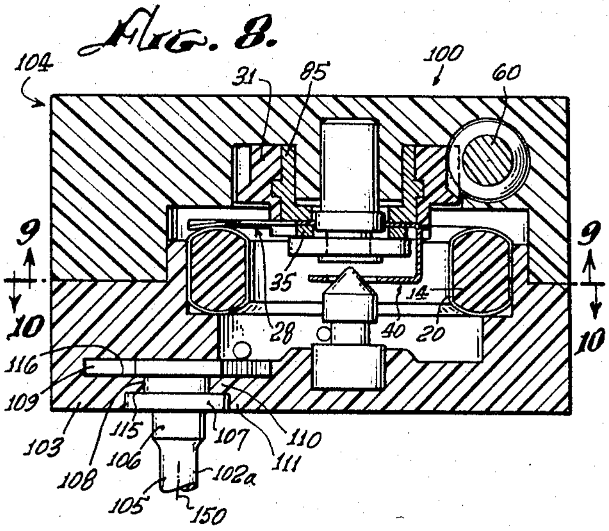
FIGURE 8 is a sectional view taken along line 8—8 of FIGURE 7.
Figure 10:
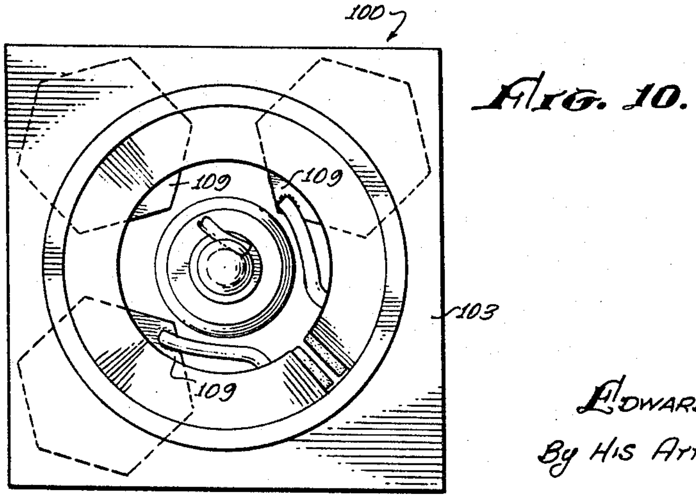
FIGURE 10 is a sectional view taken along line 10—10 of FIGURE 7.

The pins 102 are molded into the bottom section 103 as can be best seen in FIGURE 8. The pins 102 each comprise a standard connecting portion 105, a case entrance portion 106, a case molding portion 107, a trap portion 108 and a hex portion 109. The pin portions 105–109 are on a common longitudinal central axis 150. Portions 105–108 are circular in transverse section and portion 109 is hex shaped as best seen in FIGURE 10. Each pin 102 is machined from a single piece of metal stock for accuracy in dimensioning and convenience in molding. Portion 105 of the pin is a standard male pin adapted to engage with a corresponding standard female pin on a standard plug utilized on a circuit board or chassis. Case entrance portion 106 is slightly larger in diameter than portion 105 for ease of installation in the case. That is the larger diameter portion is easier to mold accurately. However, it is to be noted that the dimension of entrance portion 106 is not critical. Molding portion 107 is substantially larger in diameter than portion 106 and portion 105. The diameter of molding portion 107 is also not critical and is made as large as possible within the space limitations to provide a large area molding flange 110 and a large circumferential molding area 111. This large molding area coupled with the large area on hex portion 109, as will be discussed hereinafter, provides an extremely rugged installation of the pins 102. Trap portion 108 has a diameter substantially less than the diameter of portion 107. Hex portion 109 is made as large as possible within the space limitations of the case which in the preferred embodiment of the invention is ¼ inch square. It is required to have the area defined by the circle inscribed within the hex larger than the area of trap portion 108 so that the lower annular shoulder 115 is formed. The molding flange 110 obviously forms an upper annular shoulder 116. As can be readily observed in FIGURE 8, the case material is molded to contact the periphery of trap portion 108 and also to cover the areas of shoulders 115 and 116. Thus, as is apparent, the pin 102 is rigidly held in place by the molding and cannot move in any direction. Furthermore, this structure of pins 102 provides an efficient and novel moisture trap. That is, moisture cannot progress past pin 102 since to do so it must not only pass vertically but must also overcome the obstacles presented by the horizontal interfaces formed by shoulders 115 and 116. Shoulders 115 and 116 form in effect a circumferential groove in the pin 102 to thereby prevent moisture from entering the potentiometer at the points at which the pins 102 enter the case 104 of the potentiometer 100. The portion 109 is made hexagonal in shape to provide a multitude of surfaces that are molded in place to prevent rotation of the pins 102.

As stated hereinbefore, the preferred embodiment of this invention is a potentiometer with a ¼ inch square case. The standard pin configuration for such a potentiometer requires the pins to be on 0.1 inch centers, that is centers of opposite pins are 0.2 inch from each other. In this invention, unlike potentiometers of the prior art, the pins 102, as can be seen in FIGURE 10 are arranged so that pins **102*a* and 102*c* which are opposite are diagonally opposed, that is the line connecting the centers of pins 102*a* and 102*c* is along the diagonal of the square formed by case 104, rather than being parallel to one of the sides of the square as is true in prior art potentiometers. It is clear that if the pins 102** were placed as in the prior art, that the rigid hex structure with the advantages, discussed hereinabove, could not be achieved.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A potentiometer comprising:
an upper section housing for receiving a resistor element;
a resistor element having a portion disposed in said upper section housing;
a lower section housing coupled to said upper section housing to form an enclosure, said housing having an elongated hollow portion for receiving an elongated screw, a hollowed hub portion for receiving a gear thereover and for receiving a conductive pin therein;
a conductive pin fixed in said casing within said hollowed portion;
a gear having the metal portion integral therewith and rotatably mounted on said hub portion;
said gear, conductive pin and hub portion located substantially concentrically with said resistor element;
an elongated screw located in said elongated hollow portion and meshingly engaging said gear; and
a wiper arm of conductive material having a spring-like extension at one end thereof and integral therewith and a slot at said other end, said spring-like extension in cantilever compressed electrical contact with said resistor, and said slot coupled to said pin to form a rotatable contact therewith, said wiper arm and said pin having a conductive path to said resistor element.

2. The structure recited in claim 1 wherein said elongated hollowed portion of said housing has an axis substantially perpendicular to the axis of said hollowed hub portion of said housing.

3. The structure recited in claim 2 wherein a plurality of recesses are formed in said housing with at least two of said recesses at an angle to communicate with adjacent sides of said lower section of said housing, each of said recesses located adjacent the portion of said pin fixed in said housing and extending to and up the sides of said lower section;
said upper section of said housing having a recess therein, said upper section housing having a configuration to enable it to assume a position wherein the recess therein may be rotated to a position in alignment with either of at least two of the recesses extending from said pin.

4. The structure recited in claim 3 wherein the teeth of said gear are cut through only a portion of the shank of said gear.

5. A potentiometer comprising:
a housing having first and second sections;
said housing having therein a wiper assembly and a wound resistance
said wound resistance being operatively connected to said wiper assembly
an electrical pin extending from said housing, said pin having a portion thereof molded in said housing, and;
moisture trapping means for trapping moisture in said portion, said moisture trap means including at least three sections along said pin with successive sections having different dimensions, said dimensions selected to form a circuitous path for moisture.

6. A potentiometer as claimed in claim 5 wherein the teeth of said pinion gear are not cut throughout the shank of said gear.

7. A potentiometer as claimed in claim 6 wherein said gear includes a central metal bushing.

8. A potentiometer as claimed in claim 7 wherein said wiper assembly includes a keeper blade, said blade adapted to retain said worm in said housing.

9. A potentiometer as claimed in claim 5 wherein said housing is shaped as a rectangular parallelepiped and wherein said pin is extending perpendicular to a face of said housing and proximate a first corner thereof and including an additional pin extending perpendicular to said face and proximate a second corner diagonally opposed from said first corner.

10. A potentiometer as claimed in claim 8 wherein said housing is shaped as a rectangular parallelepiped and wherein said pin is extending perpendicular to a face of said housing and proximate a first corner thereof and including an additional pin extending perpendicular to said face and proximate a second corner diagonally opposed from said first corner.

References Cited

UNITED STATES PATENTS

| | | | |
|---|---|---|---|
| 2,720,572 | 10/1955 | Moore | 338—164 X |
| 2,876,319 | 3/1959 | Held | 338—164 |
| 3,054,077 | 9/1962 | Mellor | 338—175 |
| 3,201,737 | 8/1965 | Mathison | 338—174 |
| 3,208,024 | 9/1965 | Enos et al. | 338—174 X |
| 3,242,450 | 3/1966 | Bourns | 338—174 X |

ROBERT K. SCHAEFER, *Primary Examiner.*

H. HOHAUSER, *Assistant Examiner.*